GILSON & MARTIN.
Plow.

No. 55,279.  Patented June 5, 1866.

Witnesses:

Inventors:

UNITED STATES PATENT OFFICE.

THEODORE GILSON AND NICHOLAS MARTIN, OF PORT WASHINGTON, WIS.

IMPROVEMENT IN PLOWS.

Specification forming part of Letters Patent No. 55,279, dated June 5, 1866.

*To all whom it may concern:*

Be it known that we, THEODORE GILSON and NICHOLAS MARTIN, of Port Washington, in the county of Ozaukee and State of Wisconsin, have invented a new and Improved Plow; and we do hereby declare that the following is a full, clear, and exact description thereof, which will enable others skilled in the art to make and use the same, reference being had to the accompanying drawings, forming parts of this specification, in which—

Figure 1:
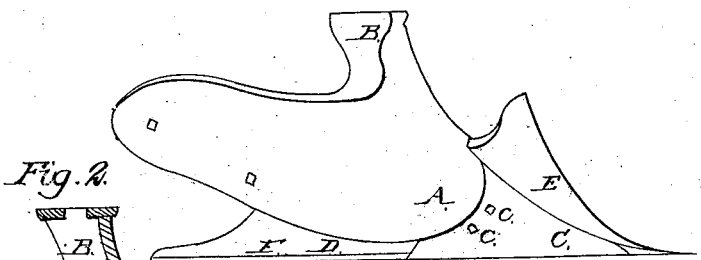
Figure 2:
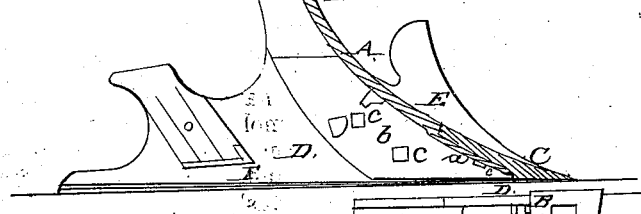
Figures 3, 4:
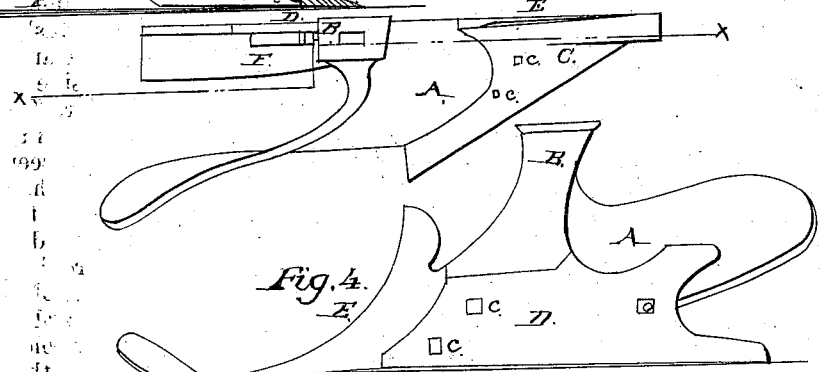
Figure 5:
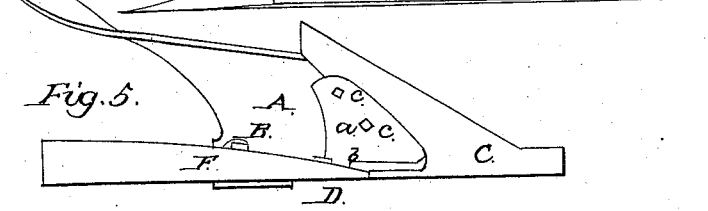
Figure 6:
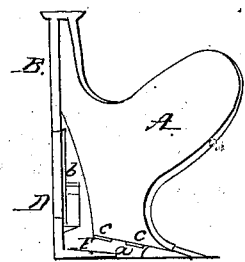

Figure 1 is a side view of our invention; Fig. 2, a side sectional view of the same, taken in the line $x\ x$, Fig. 3; Fig. 3, a plan or top view of the same; Fig. 4, a side view of the same, the side opposite to that shown in Fig. 1; Fig. 5, a bottom view or inverted plan of the same; Fig. 6, a rear view of the same.

Similar letters of reference indicate like parts.

This invention relates to a new and improved plow in which the draft is materially diminished and a strong and durable plow obtained.

A represents the mold-board, which is quite long, and has its face side in the form of a gradual spiral curve, so as to turn the sod with facility and with but little friction. The mold-board is formed with a standard, B, on which the plow-beam rests, and is secured by a bolt.

At the inner side of the front end of the mold-board, and at the left side thereof, there are flanges $a\ b$, through which bolts $c$ pass to secure the share C to the mold-board, and also the landside D, said flanges projecting from the inner sides of the mold-board, so that shoulders will be formed for the rear end of the share to abut against and cause the outer surface of the share to be flush with the outer surface of the mold-board and to cause the outer surface of the landside to be flush with the left side of the standard B.

The share is provided with a colter, E, and the landside D, it will be s...n, by referring to Fig. 4, is quite high, and has its front end abutting against the rear of the colter E and the lower end of the standard B.

The landside is also provided at its lower edge with a flange, F, (see Figs. 3, 5, and 6,) which projects inward toward the mold-board, and serves as a bearing or sole-plate to admit of the plow sliding along at the bottom of the furrow without producing much friction.

The parts above described form a very efficient plow, one which will turn a furrow with but little friction, and consequently will require but a moderate draft.

We claim as new and desire to secure by Letters Patent—

The landside D, in combination with the flanges $a\ b$ and share C, as and for the purpose specified.

THEODORE GILSON.
NICHOLAS MARTIN.

Witnesses:
ADAM EVEN,
MICHEL K. SEELER.